(12) United States Patent
He

(10) Patent No.: US 7,924,925 B2
(45) Date of Patent: Apr. 12, 2011

(54) FLEXIBLE MACROBLOCK ORDERING WITH REDUCED DATA TRAFFIC AND POWER CONSUMPTION

(75) Inventor: Zhongli He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1449 days.

(21) Appl. No.: 11/361,948

(22) Filed: Feb. 24, 2006

(65) Prior Publication Data

US 2007/0201559 A1      Aug. 30, 2007

(51) Int. Cl.
*H04N 7/12* (2006.01)
*H04N 11/02* (2006.01)
*H04N 11/04* (2006.01)

(52) U.S. Cl. ............. 375/240.24; 375/240; 375/240.01; 375/240.12; 375/240.13; 375/240.26; 375/240.27

(58) Field of Classification Search ............ 375/240.01, 375/240.12, 240.13, 240.24, 240.26, 240
See application file for complete search history.

(56) References Cited

U.S. PATENT DOCUMENTS

| | | | | |
|---|---|---|---|---|
| 7,457,362 | B2 * | 11/2008 | Sankaran | 375/240.24 |
| 7,693,220 | B2 * | 4/2010 | Wang et al. | 375/240.2 |
| 2004/0066852 | A1 | 4/2004 | MacInnis | |
| 2004/0190618 | A1 | 9/2004 | Ota et al. | |
| 2005/0105618 | A1 | 5/2005 | Booth et al. | |
| 2006/0002466 | A1 * | 1/2006 | Park | 375/240.03 |
| 2006/0104360 | A1 * | 5/2006 | Gordon | 375/240.16 |
| 2009/0003454 | A1 * | 1/2009 | Richardson et al. | 375/240.24 |

FOREIGN PATENT DOCUMENTS

EP     1 365 592 A2    11/2003

OTHER PUBLICATIONS

Dhondt et al. "Flexible macroblock ordering as a content adaptation tool in H.264/AVC", Oct. 2005, SPIE vol. 6015 601506-1.*
Thomas Wiegand, Gary J. Sullivan, Gisle Bjontegaard and Ajay Luthra, *Overview of the H.264/AVC Video Coding Standard* IEEE Transactions on Circuits and Systems for Video Technology, vol. 13, No. 7 Jul. 2003.
Bongsoo Jung, Young Hooi Hwang, Byeungwoo Jeon, Myung Don Kim, and Song-In Choi, "Error resilience performance evaluation of MPEG-4 and H264", VCIP-2003, 1050-1061.
International Search Report and Written Opinion, Nov. 2, 2007.

* cited by examiner

*Primary Examiner* — Mohammad H Ghayour
*Assistant Examiner* — Sophia Vlahos
(74) *Attorney, Agent, or Firm* — Gary R. Stanford

(57) ABSTRACT

A video encoder including a processing block and an external memory storing a current frame and a reference frame. The processing block includes a memory interface, a local memory and a processor. The processor encodes the current frame in raster scan macroblock order for FMO using information from the reference frame, converts encoded information into compressed information, and organizes the compressed information according to a predetermined FMO. The processor organizes the compressed information according to any suitable FMO organization such as scattered, interleaved, etc. The processor stores the compressed information into multiple slice groups into the local memory or into the external memory, where the slice groups are organized according to the FMO. The processor loads a search window macroblock into the local memory if not already stored in the local memory. The processor may generate unfiltered reconstructed information and store the unfiltered reconstructed information into the local memory.

20 Claims, 11 Drawing Sheets

FLEXIBLE MACROBLOCK ORDERING WITH REDUCED DATA TRAFFIC AND POWER CONSUMPTION

BACKGROUND OF THE INVENTION

1. Field of the Invention

The present invention relates in general to video encoding, and more specifically to a system and method of implementing flexible macroblock ordering while reducing data traffic and power consumption.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or storage of video signals using less storage space. The newer standard outperforms video compression techniques of prior standards in order to support higher quality streaming video at lower bit-rates and to enable internet-based video and wireless applications and the like. The standard defines the syntax of the encoded video bitstream along with a method of decoding the bitstream. Each video frame is subdivided and encoded at the macroblock (MB) level, where each MB is a 16×16 block of pixels. Each MB is encoded in 'intra-prediction' mode in which a prediction MB is formed based on reconstructed macroblocks in the current frame, or 'inter-prediction' mode in which a prediction MB is formed based on the macroblocks of the reference frames. The intra-prediction coding mode applies spatial information within the current frame in which the prediction MB is formed from samples in the current frame that have previously encoded, decoded and reconstructed. The inter-prediction coding mode utilizes temporal information from previous and/or future reference frames to estimate motion to form the prediction MB.

The H.264 standard introduced a new ability referred to as flexible macroblock ordering (FMO). FMO partitions a video frame into multiple slice groups, where each slice group contains a set of macroblocks which could be in nonconsecutive positions and could be anywhere in a frame. When used effectively, FMO significantly enhances robustness to data losses by transmitting macroblocks in a pre-determined slice group order so that the decoder has a better chance of recovering lost or corrupted macroblocks of one slice group using available macroblocks of other slice groups. The conventional method to implement FMO is to encode and then transmit the macroblocks within a slice group. The conventional method, however, loads data multiple times from a previously encoded video frame to predict the current frame during inter-prediction encoding. This results in a heavy data loading from main memory (or external memory) and high power consumption for any application, particularly wireless applications.

It is desired to provide a system and method which achieves the benefits of FMO without increasing data traffic or power consumption.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
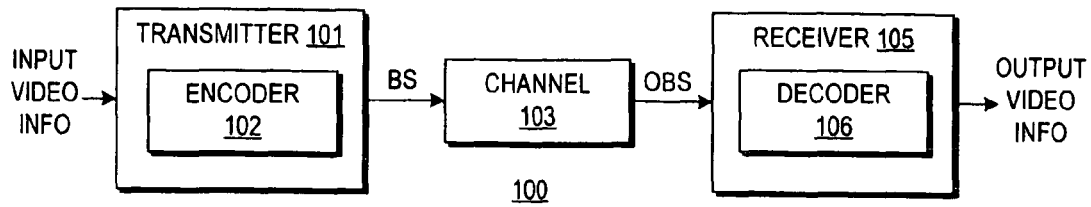
FIG. 1 is a simplified block diagram of a video system including an encoder implemented according to an embodiment of the present invention.

FIG. 1 is a simplified block diagram of a video system 100 including an encoder 102 implemented according to an embodiment of the present invention. Video information is provided to an input of a transmitter 101, which includes the encoder 102. The encoder 102 encodes the video information according to the appropriate video standard (e.g., MPEG-4, H.264, etc.) and the transmitter 101 further processes the information according to the targeted media or medium for which it is designed. The video information is transmitted as a bitstream (BS) via a channel 103 and provided as an output bitstream OBS to a receiver 105, which includes a decoder 106. The transmitter 101 encapsulates the video information into a bitstream or RTP packets or the like in which each packet includes information associated with one or more macroblocks of a video frame. The encoder 102 is configured to perform flexible macroblock ordering (FMO) with reduced data traffic and power consumption according to an embodiment of the present invention as further described below.

In many configurations, the channel 103 is a medium with constrained bandwidth such as a wireless medium or the like. For a wireless channel 103, the bitsteam is encoded by the transmitter 101 into a suitable format for wireless communications and decoded by the receiver 105. In any event, there may be data losses between the input bitstream BS and the output bitstream OBS. FMO may be used to significantly enhance robustness to data losses by transmitting macroblocks in a pre-determined macroblock organization and slice group order so that the decoder has a better chance of recovering lost or corrupted macroblocks of one slice group using available macroblocks of other slice groups. In conventional configurations, however, FMO tends to increase the data traffic within, and the power consumption of, the video encoder. The encoder 102, which is implemented according to an embodiment of the present invention, may avoid the increased data traffic and power consumption resulting in a significantly more efficient encoding process.

Figure 2:
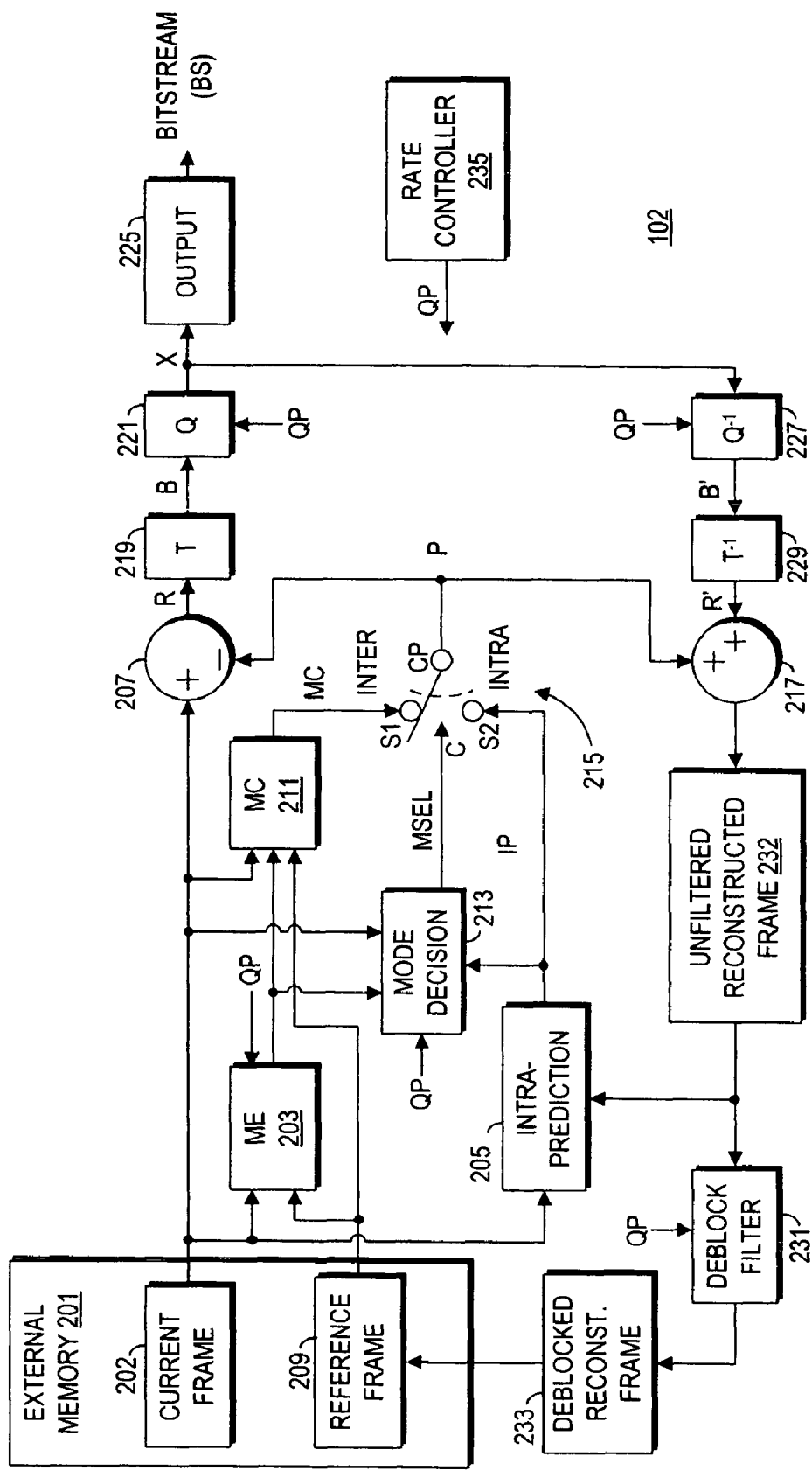
FIG. 2 is a functional block diagram of the encoder of FIG. 1 implemented according to an exemplary embodiment of the present invention.

FIG. 2 is a functional block diagram of the encoder 102 implemented according to an exemplary embodiment of the present invention. An external memory 201 stores a current frame 202 which is provided to one input of a motion estimation (ME) circuit 203, to one input of an intra-prediction circuit 205, to a positive input of a combiner 207 (e.g., adder or subtractor or the like), to one input of a motion compensation (MC) circuit 211, and to one input of a mode decision circuit 213. It is noted that the input video information includes a video sequence of multiple frames in which the current frame 202 is merely a representation of the next frame to be encoded. The memory 201 also stores a reference frame 209, which is provided to a second input of the ME circuit 203 and to a second input of the MC circuit 211. In the embodiment, illustrated, the reference frame 209 is a previously encoded, decoded, reconstructed and deblocked frame. The ME circuit 203 provides motion estimation information at its output, which is coupled to a third input of the MC circuit 211 and to a second input of the mode decision circuit 213. The MC circuit 211 provides motion compensated prediction information (e.g., inter-prediction MB) MC to a first input terminal S1 of a selector switch 215. The selector switch 215 is illustrated as a single-pole, double-throw (SPDT) having input terminals S1 and S2, control input terminal C and a common terminal CP providing a selected input as its output. The intra-prediction circuit 205 provides intra-prediction information (e.g., intra-prediction MB) IP to a third input of the mode decision circuit 213 and to the input terminal S2 of the switch 215. The mode decision circuit 213 has an output providing a mode decision select signal MSEL to the control terminal C of the switch 215 for selecting between MC (motion compensated inter-prediction MB) or IP (intra-prediction MB).

The CP terminal of the switch 215 provides a selected prediction MB, illustrated as symbol P, to a negative input of the combiner 207 and to a positive input of another combiner 217, which is an adder in the illustrated embodiment. The combiner 207 subtracts the selected prediction MB P from the current MB of current frame 202 to provide a residual MB, illustrated as symbol R, to the input of a transform circuit 219. The transform circuit 219 performs a block transform, such as the discrete cosine transform (DCT), and outputs the transform result, illustrated as symbol B. The transform result B is provided to a quantization circuit 221, which outputs quantized transform coefficients, illustrated as symbol X. The X coefficients, along with other video information represents encoded video information. The X coefficients are provided to the input of an output block 225, which further encodes, compresses and converts the encoded information into the compressed bitstream BS for transmission via the channel 103, or otherwise for storage. The output block 225 performs various functions for converting the X coefficients into the bitstream BS, including, scan functions and entropy encoding, which collectively encapsulate the encoded information into the appropriate format for the channel 103.

The X coefficients are provided to the input of an inverse quantization circuit 227, which outputs estimated transformed information, illustrated as symbol B', which represents an estimated or reconstructed version of the transform result B. The estimated transformed information B' is provided to the input of an inverse transform circuit 229, which outputs estimated residual information, illustrated as symbol R', which represents a reconstructed version of the residual MB R. The reconstructed residual MB R' is provided to another positive input of the combiner 217. In the embodiment shown, the combiner 217 adds P to R' to generate an unfiltered reconstructed MB, which forms a portion of an unfiltered reconstructed frame 232. The unfiltered reconstructed frame 232 is provided to a second input of the intra-prediction circuit 205 and to an input of a deblocking filter 231. The deblocking filter 231 (e.g., per H.264 specification) filters the unfiltered reconstructed frame 232 and provides a deblocked reconstructed frame 233 to be stored in the external memory 201. The deblocked reconstructed frame 233 may be stored separately or, as shown, is stored as the reference frame 209 for purposes of encoding the next frame as known to those skilled in the art.

The encoder 102 is also shown including a rate controller 235 providing a quantization parameter (QP). The QP is provided to and used by various circuits of the encoder, including the ME circuit 203, the mode decision circuit 213, the quantization circuit 221, the inverse quantization circuit 227, and the deblocking filter 231. The QP is provided to the ME circuit 203 for purposes of adjusting motion mode bias. Although not shown, the decoder 106 includes a similar processing path for converting the received bitstream OBS to reconstructed frames for storage or display. For example, the decoder 106 performs entropy decoding, inverse quantization, inverse transform, deblock filtering, etc.

Motion estimation involves searching for a reference MB within the reference frame 209 that most closely matches the current MB being encoded in the current frame 202. Note that each current MB is located in the position of multiple 16 pixels, such as 0, 15, 31, ..., etc. However, the position of the best matched MB in the reference frame may start from arbitrary position within a pre-defined search window, including ½ or ¼ pixel position after interpolation. The reference MB is in the form of a single reference MB (with a single motion vector) or multiple sub-blocks combined together (with multiple motion vectors) that collectively form a reference MB. The sub-block combinations include, for example, two 16×8 sub-blocks for the 16×8 motion mode, two 8×16 sub-blocks for the 8×16 motion mode, or four 8×8 sub-blocks for the 8×8 motion mode, which can further be partitioned into 4×8, 8×4, and 4×4 sub-blocks. The sub-blocks forming any sub-block combination used as the reference MB may be selected from any combination of MBs in the search pattern and are not necessarily contiguous. In one embodiment, an integer search is first performed to find an integer reference MB and then the reference MB is further interpolated within the ME circuit 203 down to the ½ or ¼ pel (picture element or pixel) to achieve more accurate reference information. Alternatively, an integer search can be combined with a sub-pixel search or the search itself may be performed at the sub-pixel level during motion estimation. The ME circuit 203 provides one or more motion vectors to the MC circuit 211, which forms the inter-prediction block from the reference frame 209 using the computed motion vector(s).

The present invention is illustrated herein using the quarter common intermediate format (QCIF) at a frame rate of 30 frames per second (fps) and using an inter-prediction encoding search area or window of 3×3 macroblocks (or 48×48 pixels). The QCIF video format is commonly used for video conferencing applications and has a resolution of 176×144 pixels, which corresponds to a picture size of 11×9 macroblocks (11 MB wide by 9 MB tall, each MB including 16×16 pixels). The present invention also applies to other picture sizes, including full CIF with a resolution of 352×288 pixels, video graphics array (VGA) with a resolution of 640×480 pixels, D1 with a resolution of 720×480, super VGA with a resolution of 800×600, and high-definition video with resolutions of 1280×720, and 1920×1080, etc. The present invention is illustrated for two different FMO modes each having two slice groups, including an interleaved FMO mode and a scattered FMO mode as further described below. The interleaved and scattered FMO modes are exemplary only, and it is understood that the present invention applies to other FMO modes and slice group sizes and configurations, including those that are currently-defined or those that are newly defined including any user-defined FMOs.

Figure 3:
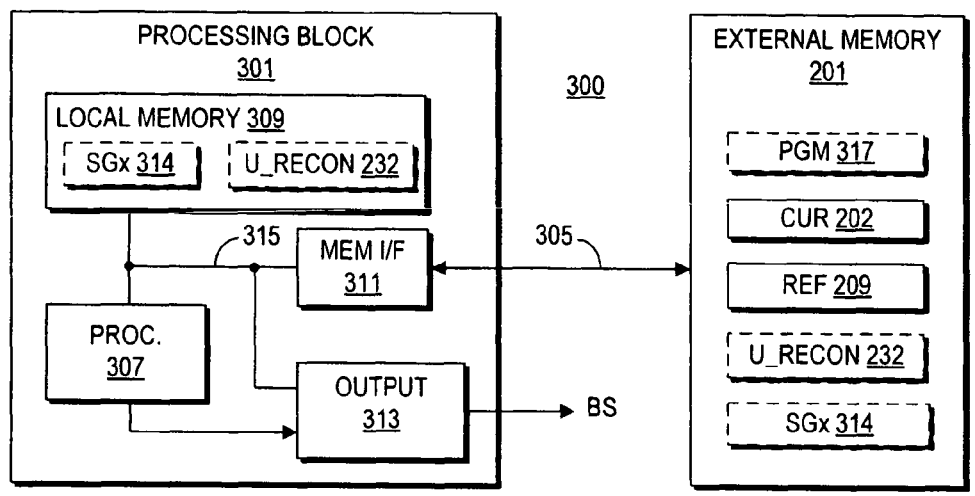
FIG. 3 is a simplified block diagram of a video processor system for implementing the video encoder of FIG. 2 according to several exemplary embodiments of the present invention.

FIG. 3 is a simplified block diagram of a video processor system 300 for implementing the video encoder 102 according to several exemplary embodiments of the present invention. The video processor system 300 includes a processing block 301 coupled to the external memory 201 via a suitable memory interface 311 and memory bus 305. In one embodiment, the processing block 301 is implemented on a single module of an integrated circuit (IC) or chip. In another embodiment, the processing block 301 is implemented as a chipset including one or more chips coupled together with suitable connections and interfaces and supporting circuitry and components. In yet another embodiment, the processing block 301 is implemented with discrete devices or circuits for implementing the various hardware functions. The processing block 301 includes a processor 307, a local memory 309, the memory interface 311, and an output circuit 313 coupled together via appropriate internal interfaces or buses, collectively shown as a bus 315. It is understood that the bus 315 may represent a single, common bus for the internal processing components or multiple independent buses for interfacing respective two or more of the internal components together as understood by those skilled in the art. The memory interface 311 couples to the memory bus 305 for enabling transfer of information between the external memory 201 and the processing block 301.

The external memory 201 is implemented as any suitable type or combination of random access memory (RAM), such as double data rate (DDR) memory or synchronous dynamic RAM (SDRAM) or the like. The size and configuration of the external memory 201 along with the amount and type of information stored at least partly depends upon the configuration and implementation of the processing block 301. The local memory also may also include suitable type or combination of RAM, such as embedded DRAM (EDRAM) or synchronous RAM (SRAM) of the like. In a mostly software embodiment, the processor 307 is implemented as a general-purpose central processing unit (CPU) or the like not specifically implemented for video encoding functions, such as any of the Pentium® microprocessors by the Intel Corporation, an ARM processor or any other reduced instruction set computer (RISC) processor, a digital signal processor (DSP), etc. The processor 307 may include a CPU or processing core (not shown) and the local memory 309 is configured as an on-chip cache or the like including an instruction cache and a data cache. The data cache may be an L1 cache of suitable size, such as 16 kilobytes (KB) or the like. In the software embodiments, the external memory 201 stores a video encoder program (PGM) 317 for performing the primary functions of the video encoder 102. In particular, the program 317 is written and compiled for the processor 307 for performing the various video encoder functions, such as those functions performed by the ME circuit 203, the MC circuit 211, the intraprediction circuit 205, the deblocking filter 231, etc. The program 317 is shown with dashed lines indicating that it may not be included for hardware-based configurations.

In a more hardware-based configuration, the processor 307 includes dedicated hardware for implementing a video processor. The program 317 is substantially reduced or eliminated altogether since the processing block 301 is specifically configured and dedicated to perform the video functions. The video processor itself may include a processor or CPU along with its own cache (not shown) and supporting circuitry. The processing block 301 may be implemented as a chipset configured to perform video processing functions, where the local memory 309 is implemented as a separate buffer or the like or even an on-chip buffer memory for integrated solutions.

In yet another embodiment, the processor 307 is implemented as a hardware video encoder. The program 317 is eliminated altogether and the local memory 309 is configured as a relatively small buffer. This hardware video encoder embodiment is suitable for relatively small devices with limited processing, memory and power resources, such as mobile or hand-held and/or battery-powered devices. In one embodiment, the local memory 309 is sufficient to store at least a 48×48 pixel search window for QCIF applications as further described below.

The external memory 201 stores additional data and information, including the current frame 202, the reference frame 209, and in certain embodiments, the unfiltered reconstructed frame (U_RECON) 232. The deblocked reconstructed reference frame 233 may be stored separately or as the reference frame 209. In certain embodiments of the present invention, the unfiltered reconstructed frame 232 is not stored in the external memory 201 but instead remains stored entirely within the local memory 309 during the encoding process. Thus, the unfiltered reconstructed frame 232 is shown with dashed lines in both the external memory 201 and the local memory 309. As described further below, the processing block 301 processes the video data in raster scan macroblock order (even for FMO) and also performs the deblocking filter functions, so that the unfiltered reconstructed frame information may be converted to the deblocked reconstructed frame information within the processing block 301 without having to be stored in and retrieved from the external memory 201 further improving operation.

In one embodiment the local memory 309 stores compressed slice groups shown as SGx 314, in which "x" is an index denoting information from particular slice groups (e.g., SG0, SG1, . . . , SGN for "N" slice groups in which N is a positive integer greater than zero). In conventional FMO operation, the current frame 202 is divided into slice groups processed in slice group order, so that all macroblocks of a first slice group are processed first, followed by the macroblocks of a second slice group, and so on. In order to achieve the benefits of FMO, the bitstream BS is transmitted in slice group order. In an embodiment according to the present invention, the current frame 202 is processed in natural raster scan MB order (e.g., from left-to-right and top-to-bottom) instead of the conventional FMO slice group order so that macroblocks from different slice groups are processed before the first slice group has been completed. In this manner, the compressed information from subsequent slice groups is stored as the slice groups SGx 314 and transmitted at the appropriate time to maintain transmission of the slice groups in slice group order. In an alternative embodiment, the compressed slice groups SGx 314 are stored in the external memory 201 as further described below.

Figure 4:
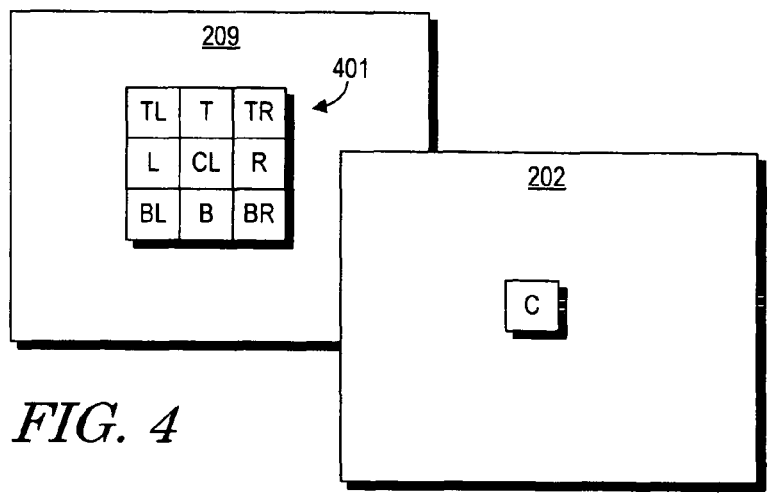
FIG. 4 is a figurative block diagram illustrating a current macroblock of the current frame to be encoded using inter-prediction encoding using information from the reference frame.

FIG. 4 is a figurative block diagram illustrating a current MB of the current frame 202 to be encoded using inter-prediction encoding using information from the reference frame 209. The current MB in the current frame 202 is labeled "C" and is the next MB within the current frame 202 to be encoded. The reference frame 209 includes a collocated MB labeled CL, which is positioned at the same relative position within the reference frame 209 as the location of the current MB within the current frame 202. In order to encode the current MB using inter-prediction encoding, the ME block 203 performs a search within a predetermined search window or search area 401 of the reference frame 209 in order to find a suitable reference MB used to reconstruct the current MB. In the embodiment illustrated, the search area 401 includes the neighboring macroblocks of the macroblock CL, including a top left macroblock TL, a top macroblock labeled T, a top right macroblock labeled TR, a left macroblock labeled L, a right macroblock labeled R, a bottom left macroblock BL, a bottom macroblock labeled B, and a bottom right macroblock labeled BR (for a 3×3 search area). It is appreciated that the current macroblock C and the nine macroblocks from the reference frame must be loaded into the local memory 309 for inter-prediction encoding. The unfiltered reconstructed information (e.g., unfiltered reconstructed frame 232) is stored in the external memory 201 and then reloaded back into the local memory 309 for deblock filtering or remains within the local memory 309. Deblock filtering can be peformed on each unfiltered reconstructed macroblock (together with the pixels of the neighborhood unfiltered reconstructed macroblocks surrounding it) and the collection of deblocked reconstructed macroblocks forms the deblocked reconstructed frame 233 which is stored as the reference frame 209 for encoding the next frame.

The processor 307 retrieves information from the external memory 201 and loads the information into the local memory 309 for video processing. For example, each macroblock of the current frame 202 is loaded one at a time into the local memory 309 along with one or more reference macroblocks from the reference frame 209 within the search area 401 corresponding to the current macroblock, and the resulting reconstructed macroblock (either prior to and/or after deblocking) is stored back out to the external memory 201. It is appreciated that a significant amount of information is transferred back and forth across the memory bus 305 during video processing. The level of information transfer directly impacts the processing speed and power consumption of the video processor system 300, so that it is desired to keep the amount of information transferred to a minimum. The level of information transferred across the memory bus 305 is increased even further when FMO is employed. In the FMO case in particular, when the next macroblock to be processed in the current frame 209 is not adjacent to the last macroblock just processed or is not adjacent to previously loaded reference macroblocks, at least a portion of the reference information already stored in the local memory 307, and possibly all of the stored reference information, is not applicable and additional memory reads are necessary to retrieve the appropriate reference macroblocks from the reference frame 209.

Figure 5:
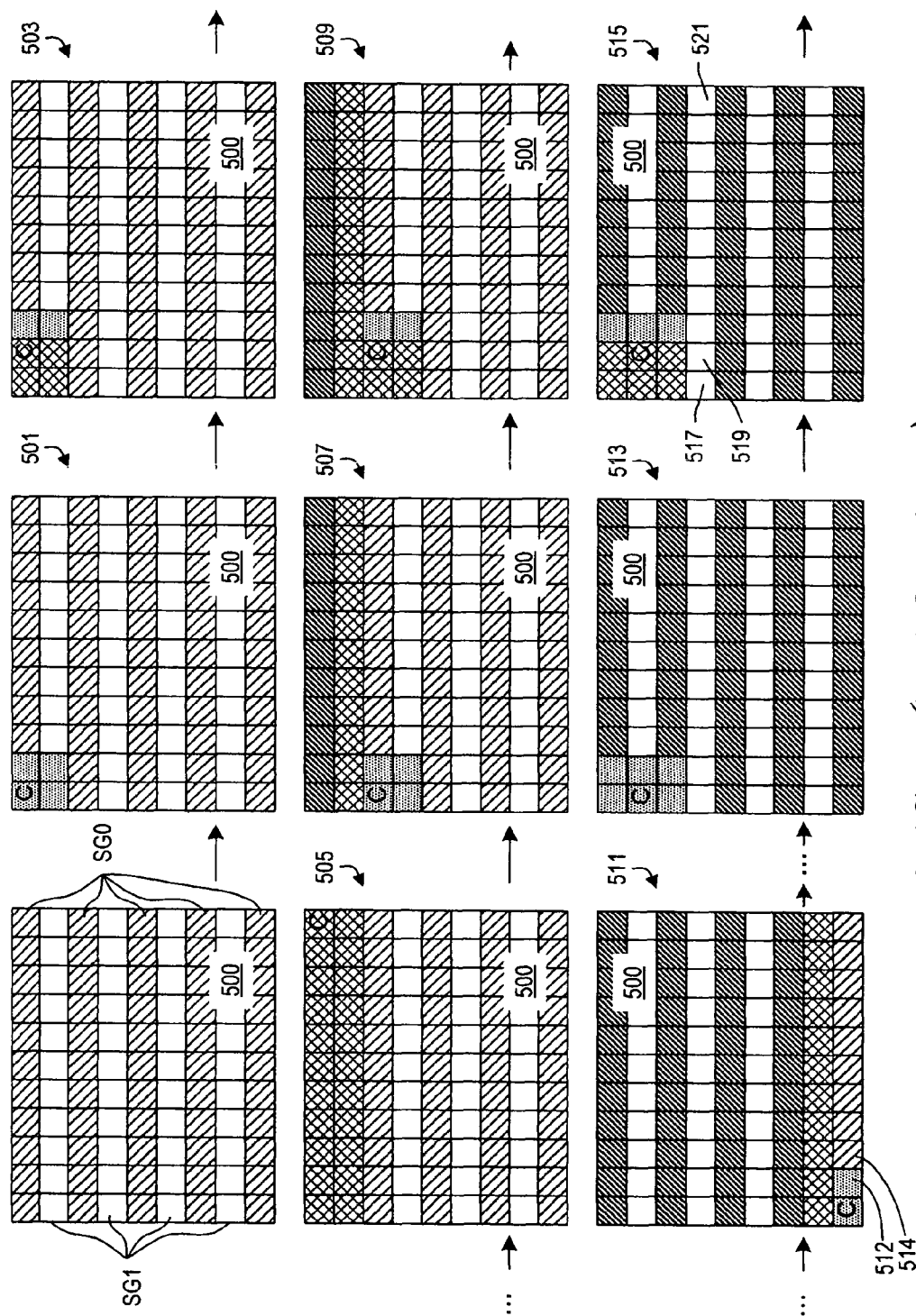
FIG. 5 is a series of diagrams illustrating data loading from a reference frame for motion estimation processing during inter-prediction encoding of a current frame organized as interleaved FMO using a conventional video encoder implemented with a larger buffer, such as a buffer holding about two rows of macroblocks)

FIG. 5 is a series of diagrams illustrating data loading from a reference frame for motion estimation processing during inter-prediction encoding of a current frame 500 organized as interleaved FMO using a conventional video encoder implemented with a larger buffer. In the illustrated embodiment, the buffer holds two macroblock rows of a reference frame for motion estimation. In the interleaved configuration, a first slice group SG0 includes the top row of macroblocks and every other row thereafter. The macroblocks of the first slice group SG0 are each shaded lightly with diagonal lines. A second slice group SG1 includes the second row of macroblocks and every other row thereafter. The macroblocks of the second slice group SG1 are not shaded (e.g., white boxes). In a first processing iteration shown at 501, the upper left MB of the current frame 500, labeled with a C, is the current MB to be processed. In order to process the current macroblock C, the collocated macroblock of a corresponding reference frame (not shown) along with the neighboring macroblocks of the collocated macroblocks are loaded into the local memory 309. The corresponding reference frame is not shown in the series. Instead, the macroblocks in the current frame 500 that are collocated with the macroblocks loaded from the reference frame are shown with light dotted shading, thereby indicating the relative locations of the four macroblocks from the reference frame to be loaded for inter-prediction encoding of the current macroblock C.

In a second processing iteration 503, the second macroblock of the top row becomes the current macroblock to be encoded and is again labeled C. An arrow is provided between successive macroblock processing iterations of the current frame 500 and arrows with intermediate ellipses ( . . . ) are provided that intermediate steps have been skipped and are not shown. As shown in iteration 503, the four macroblocks in the current frame 500 that are collocated with the four macroblocks that were previously loaded into the local memory 309 during the first processing iteration 501 are shown with cross-hatched shading, including the collocated macroblock of the current macroblock C. Since the four neighboring macroblocks from the reference frame are still stored in the local memory 309, they do not have to be re-loaded from the external memory 201. The third macroblock of each of the first and second rows of the reference frame are loaded into the local memory 309 for iteration 503 as indicated by the light-dotted shading of the collocated macroblocks in the current frame 500. Operation proceeds in this manner along the top row of the current frame 500 for the slice group SG0, in which each increment after the first requires a loading of two additional macroblocks from the reference frame. When the last macroblock of the top row (i.e., upper-right macroblock) of the current frame 500 becomes the current macroblock as shown in a subsequent iteration 505 (after skipping remaining intermediate iterations of the top row), the corresponding collocated macroblock and its neighboring macroblocks have already loaded into the local memory 309 during prior iterations. In this manner, the processing block 301 already has sufficient information to encode the upper right macroblock without additional macroblock loading. In this case with a larger local memory 309 (which is able to hold a little more than two complete rows as further described below), the top two macroblock rows of the reference frame have been loaded into the local memory 309 as indicated by cross-hatch shading of the collocated macroblocks in the current frame 500 shown for iteration 505. At this point, 4+2+2+2+2+2+2+2+2+2+0=22 macroblocks have been loaded into the local memory 309 for encoding the top row, which is equivalent to two complete macroblock rows.

In the next processing iteration 507, the current block C skips to the first block of the third row of the current frame 500. The top row is shaded with dark diagonal lines denoting macroblocks that have already been encoded. The second row is shaded with cross-hatching denoting that the entire second row is still stored within the local memory 309. It is also noted that the upper row (the first row in this moment) of macroblocks of the reference frame is already loaded into the local memory 309 at this point. However, this information is useless for performing subsequent inter-prediction encoding in this conventional case since the search window is restricted to 3×3 macroblocks and conventional processing according to interlaced FMO organization skips to the third row. For iteration 507, the reference macroblocks of the current macroblock C include the first two macroblocks of the second row, which have already been loaded into the local memory 309 as indicated by cross-hatched shading. The collocated macroblock of the current macroblock and the remaining three neighboring macroblocks (including the second macroblock in the third row and the first two macroblocks in the fourth row) are shaded with dots to indicate that the collocated macroblocks from the reference frame must be loaded into the local memory 309 for encoding the current macroblock C for iteration 507. In the very next iteration 509, the second macroblock of the third row becomes the current macroblock C and cross-hatched shading illustrates the corresponding macroblocks that are already stored in the local memory 309 at this point. The third macroblock of each of the third and fourth rows are shaded with light-dotted shading indicating that two additional macroblocks must be loaded into the local memory 309 from the external memory 201 to encode the current macroblock C for iteration 509. Operation progresses down the third row in a similar manner as the first row, in which each intermediate macroblock encoding causes an additional loading of two macroblocks each. The last macroblock does not require additional loading. The number of macroblocks loaded for processing the third row is the same as the first row, or 22 macroblocks.

Processing continues in similar manner across each row for every other row in the current frame 500 until an iteration 511, in which the lower-left hand macroblock becomes the current macroblock. The first, third, fifth and seventh rows have been encoded as shown by dark diagonal line shading. At this point, because of prior loading and processing, the entire eighth row has already been loaded into the local memory 309. In this manner, two additional macroblocks need to be loaded for processing the first macroblock of the last row (i.e., the lower-left macroblock of the current frame 500). Although not shown, each subsequent iteration for the remaining macroblocks in the last row, other than the last macroblock, requires only one additional macroblock loading. As an example, when encoding the second macroblock 512 of the last row, the first three macroblocks of the eighth row and the first two macroblocks of the last row of the reference frame have already been loaded, so that the collocated macroblock of the third macroblock 514 of the last row must still be loaded. The last macroblock of the last row of the slice group SG0 does not require additional loading since by this point the entire two bottom rows have been loaded. In this manner, the last row for the slice group SG0 results in 2+1+1+1+1+1+1+1+1+1+0=11 macroblocks or one complete row. The encoding of the entire slice group SG0 results in a total loading of 99 macroblocks, which is equivalent to one complete frame of macroblocks.

After the entire slice group SG0 is encoded, operation proceeds to the first macroblock of the second row which is the first macroblock of the slice group SG1 as shown by iteration 513. In this case, all six collocated neighboring macroblocks, including the current macroblock C and its five neighboring macroblocks, must be loaded into the local memory 309 as illustrated. At next iteration 515, an additional 3 macroblocks are loaded for the second macroblock of the second row of the slice group SG1. In this manner, the first row of the slice group SG1 requires 33 macroblock loadings which is equivalent to three complete macroblock rows. Although not shown, when the first row of slice group SG1 is completed, the first macroblock 517 of the fourth row becomes the current macroblock. Since the entire third row has been stored in the local memory 309 at this point, four macroblocks are loaded (including the first two macroblocks of each of the fourth and fifth rows). And then the next macroblock 519 becomes the current block in the next iteration (not shown), in which two additional macroblocks are loaded. And the last macroblock 521 in the same row does not require additional loading. In this manner, the fourth row of the current frame 500, or the second row of the slice group SG1, requires 4+2+2+2+2+2+2+2+2+2+0=22 macroblocks or two more macroblock rows. The remaining two rows of the slice group SG1 also require loading of 22 macroblocks each. In this manner, encoding of the slice group SG1 requires a total loading of another 99 macroblocks or another complete frame of loading. When inter-prediction encoding of the current frame 500 is complete, including separate inter-prediction encoding of both slice groups SG0 and SG1, two complete reference frames have been loaded from the external memory 201 into the local memory 309 for motion estimation.

Figure 6:
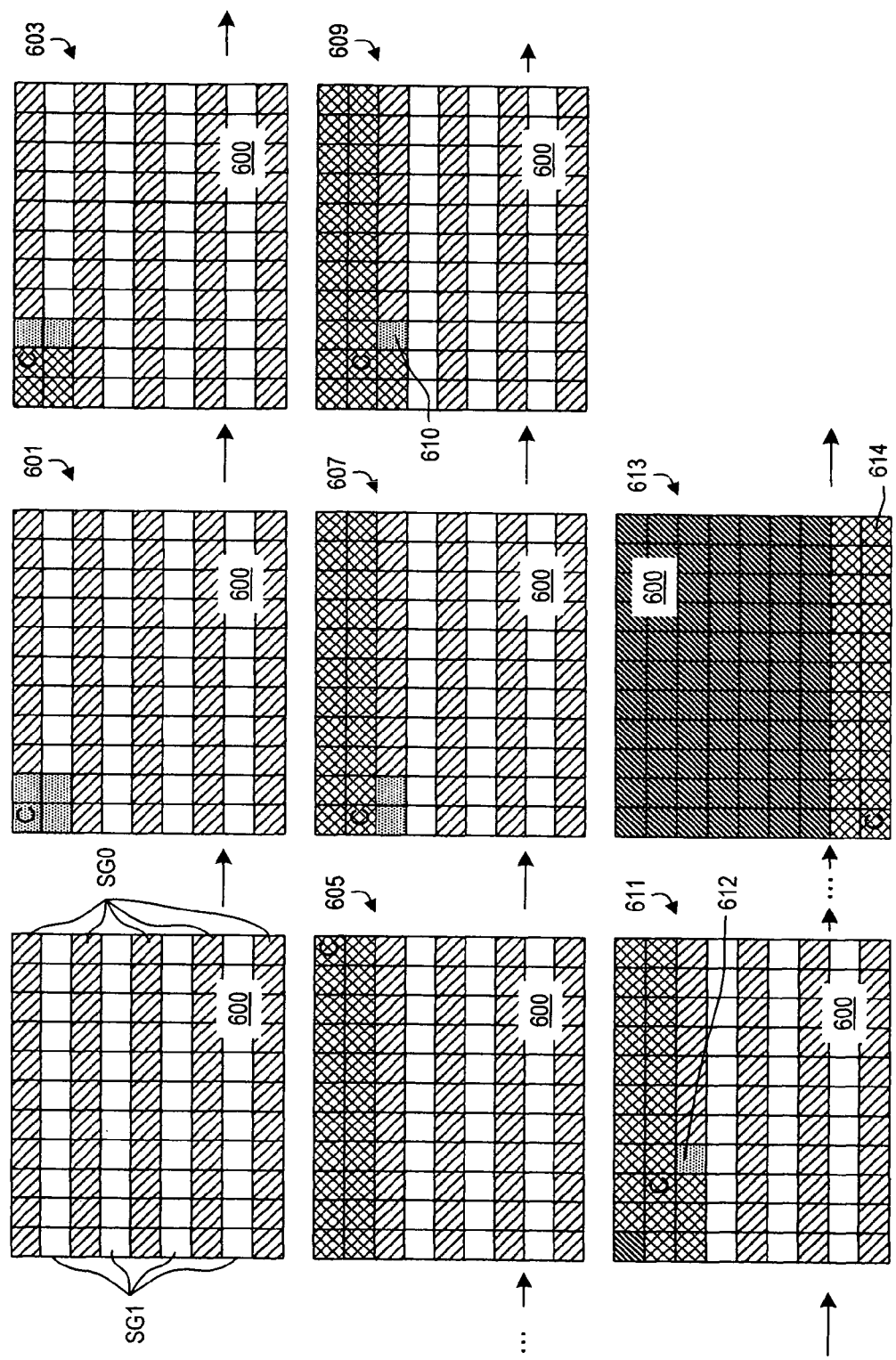
FIG. 6 is a series of diagrams illustrating data loading from a reference frame for motion estimation processing during inter-prediction encoding of a current frame organized as interleaved FMO using the video processing system of FIG. 3 implemented with the larger buffer and operating according to an embodiment of the present invention.

FIG. 6 is a series of diagrams illustrating data loading from a reference frame for motion estimation processing during inter-prediction encoding of a current frame 600 organized as interleaved FMO using the video processing system 300 implemented with the larger buffer and operating according to an embodiment of the present invention. As illustrated by iterations 601, 603 and 605, the first row of the current frame 600 is processed in substantially the same manner as the first row of the current frame 500 as previously described. A total of 22 macroblock loadings are performed and the upper two macroblock rows of the current frame 600 remain stored in the local memory 309. In the next iteration 607, operation proceeds to the first macroblock of the second row rather than the first macroblock of the third row. In this manner, operation proceeds in natural raster scan order rather than interleaved slice group ordering as was the case for the current frame 500. Since the first two macroblocks of the first two rows have already been stored in the local memory 309, only two more macroblocks (the first two macroblocks of the third row) are loaded for the current macroblock C for the iteration 607. Note that for the conventional method as shown by iteration 507, four macroblocks were required for the first macroblock of the third row for the second row of the slice group SG0.

It is also noted that since the first two macroblock rows of the corresponding reference frame are still needed for processing the second row of the current frame 600, it is preferable not to overwrite any of the currently-stored macroblocks. This capability, however, depends on the amount of memory of the local memory 309 that is allocated for storing macroblocks of the reference frame. In one embodiment, it is desired that the local memory 309 have sufficient memory for storing at least two entire macroblock rows plus an additional three macroblocks. As shown by the next iteration 609, the second macroblock of the second row becomes the current macroblock C. Since the first two macroblock rows and the first two macroblocks of the third row are already stored in the local memory 309, only one additional macroblock is loaded, which is the third macroblock 610 of the third row. During next iteration 611, the current macroblock C increments to the third macroblock in the second row, and only 1 additional macroblock 612 is loaded. Operation proceeds in similar manner for the current macroblock row such that only one more macroblock is loaded for each iteration except for the last, which does not require and additional loading. The total number of macroblocks loaded for the second macroblock row is 2+1+1+1+1+1+1+1+1+1+1+0=11 macroblocks or one complete row for reference frame for motion estimation.

Eleven macroblocks are loaded for each of the next six macroblock rows of the current frame 600. The last macroblock row is then initiated as shown by iteration 613, in which the first 7 rows have been encoded. The eighth row has also been encoded, but is shown using cross-hatched shading since the corresponding collocated macroblocks from the reference frame are loaded into the local memory 309. The current macroblock C for the iteration 613 is shown as the first macroblock of the last row of the current frame 600. Since the last two macroblock rows are completely stored within the local memory 309 at this point, the last row of the current frame 600 may be processed without additional loading. In this manner, 22 macroblocks are loaded for the first row, 11 macroblocks are loaded for the intermediate 7 rows, and no additional macroblocks were loaded for the last row for a total of 99 macroblocks or one complete frame of macroblocks for the reference frame. When the last macroblock 614 of the last row is encoded, the entire current frame 600 is encoded with a total of 99 macroblock loads. The current frame 600 encoded using natural raster scan ordering loaded only 99 macroblocks whereas the current frame 500 encoded according to the conventional method using slice group ordering required twice as many macroblocks or two full frames. The video processing system 300 implemented according to an embodiment of the present invention reduces the amount of macroblock loading from the reference frame by 50% for loading data from reference frame for motion estimation.

An additional benefit of processing macroblocks of a frame in raster scan macroblock order according to an embodiment of the present invention is a reduction or even elimination of transfer of unfiltered reconstructed information between the local memory 309 and the external memory 201. During the inter-prediction processing of the current frame 500 organized as interleaved FMO according to the conventional method, unfiltered reconstructed information should be transferred back to the external memory 201 and then re-loaded back to the local memory 309 for deblock filtering for a cost effective implementation. Deblock filtering requires information from adjacent unfiltered reconstructed macroblocks. In the conventional method for encoding interleaved FMO, however, adjacent information is temporarily skipped and thus not immediately available. Instead, reconstruction of the first slice group SG0 must first be completed before reconstruction of the second slice group SG1 is initiated as indicated by the corresponding encoded macroblocks shown by iteration 513, so that insufficient information is available for deblock filtering of the macroblocks of the first slice group SG0. In other words, deblock filtering of the macroblocks of the first slice group SG0 requires unfiltered reconstructed macroblocks of the second slice group SG1. For example, in order to deblock filter the unfiltered reconstructed macroblocks of the first and third rows of the current frame 500, unfiltered reconstructed information from at least a portion of the macroblocks of the second and fourth rows must also be available. The second and fourth rows in the current frame 500 are not reconstructed until the second pass of the current frame 500, however, so that the unfiltered reconstructed information from the first scan row SG0 must be temporarily stored. And in order to avoid the cost of a large local memory 309, the unfiltered reconstructed information of the first slice group SG0 is temporarily stored back into the external memory 201. And when sufficient unfiltered reconstructed information is available from the second slice group SG1, the unfiltered reconstructed information from the first slice group SG0 must be read back into the local memory 309 for deblock filtering to convert to the final deblocked picture.

In a system and method according to an embodiment of the present invention, encoding is performed in natural raster scan macroblock order so that adjacent unfiltered reconstructed information is available sooner as compared to interleaved slice group order. In FIG. 6, the entire top row and the first two macroblocks of the second row have been encoded as of the iteration 611 and may further be reconstructed. In this manner, sufficient information is available to deblock filter the first two macroblocks of the first row and to write the deblocked reconstructed macroblocks out to the external memory 201. The local memory 309 stores at least one complete macroblock row of unfiltered reconstructed information to enable avoiding transferring the unfiltered reconstructed information between the local memory 309 and the external memory 201.

Figure 7:
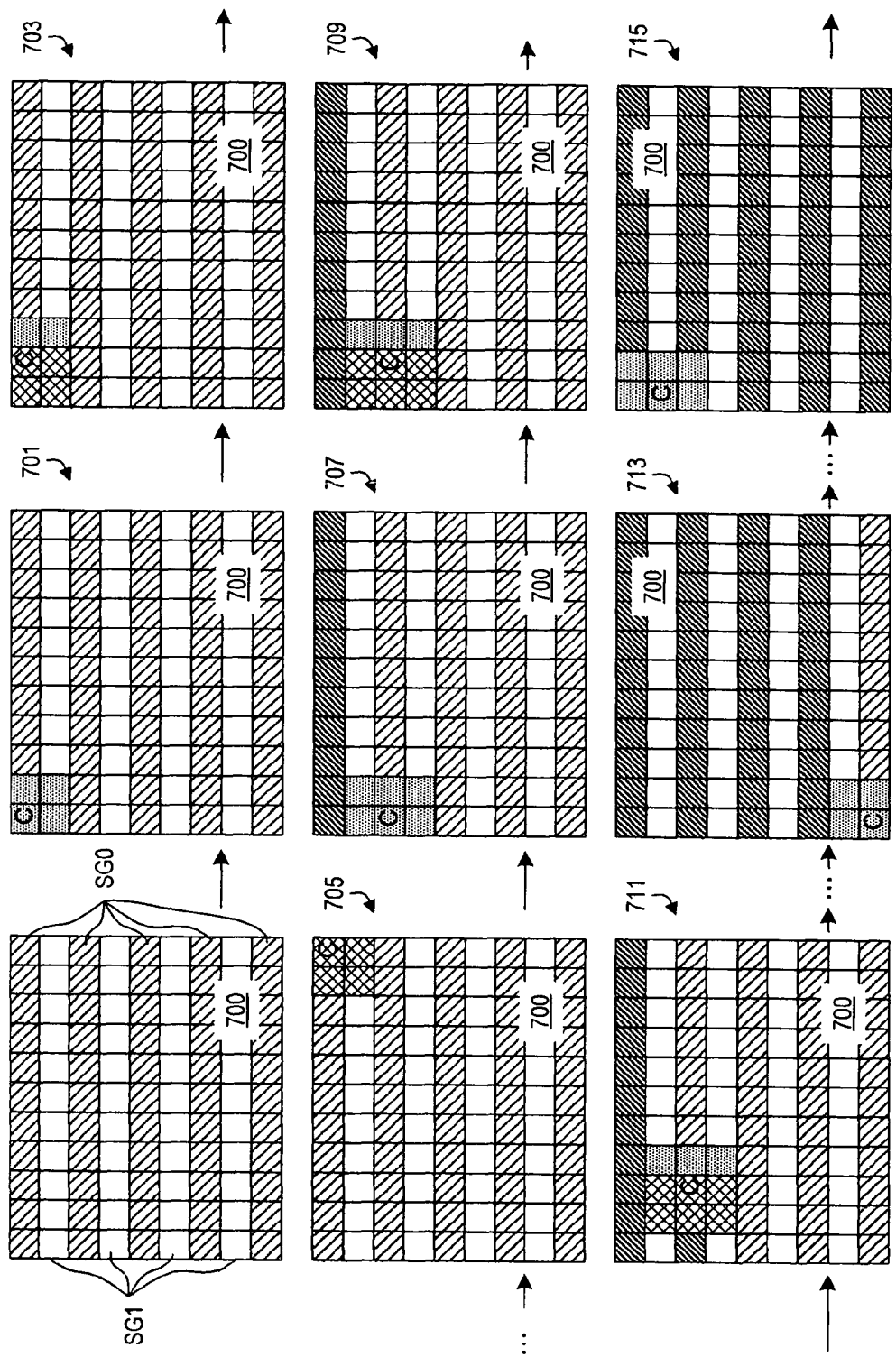
FIG. 7 is series of diagrams illustrating data loading from a reference frame for motion estimation processing during inter-prediction encoding of a current frame organized as interleaved FMO using a conventional video encoder implemented with a small hardware buffer, such as a buffer holding 3×3 macroblocks from the reference frame search window)

FIG. 7 is series of diagrams illustrating data loading from a reference frame for motion estimation processing during inter-prediction encoding of a current frame 700 organized as interleaved FMO using a conventional video encoder implemented with a small hardware buffer. In the illustrated embodiment, the local memory 303 is a relatively small hardware buffer that only has sufficient storage for a search area of 3×3 macroblocks (e.g., 48×48 bytes) from the reference frame. Operation begins in substantially the same manner as the current frames 500 and 600 as illustrated by iterations 701 and 703. As shown at iteration 703, a total of six macroblocks have been retrieved from a corresponding reference frame (not shown) for encoding the second macroblock of the first row. And though not shown, an additional two macroblocks are loaded for the third macroblock for a total of eight macroblocks. In a next iteration (not shown) for encoding the fourth macroblock of the first row, two more macroblocks are loaded for a total of ten macroblock loadings. Since the local buffer 303 only holds nine macroblocks, however, at least a portion of the loaded macroblock information is over-written. At a subsequent iteration 705 at the end of the first row for the current frame 700, sufficient information has been loaded for encoding the last macroblock of the first row. However, in contrast to that shown for current frames 500 or 600, the local memory 303 does not store the entire first and second rows from the reference frame since its capacity is limited. Similar to the cases for current frames 500 and 600, a total of 22 macroblocks are loaded for encoding the first macroblock row.

In the next processing iteration shown at 707, similar to the iteration 507, the current block C skips to the first block of the third row of the current frame 700. The top row is shaded with dark diagonal lines denoting encoded macroblocks. The second row is not shaded since none of the macroblocks remain stored within the local memory 309 since already over-written by this point. In this case, all six neighboring macroblocks must be loaded from the external memory 201 for encoding the first macroblock of the third row. As illustrated by next iteration 709, an additional 3 macroblocks are loaded for the next macroblock in the third row, and the top row is completely encoded. As illustrated by next iteration 711, an additional 3 macroblocks are again loaded for encoding the third macroblock of the third row. At this point, the local buffer 309 stores a maximum of nine reference macroblocks so that it no longer stores the first macroblock of the second, third and fourth rows from the reference frame. In this manner, three additional macroblocks are loaded to encode each subsequent macroblock in the third row other than the last. The last macroblock in the row does not require additional loading. And the allocated portion of the buffer for loading reference information is completely overwritten while progressing along the row. Each intermediate row (other than the first and the last rows) results in an additional loading of 33 macroblocks.

The last row is initiated as shown by iteration 713 in which the first macroblock requires four macroblocks to be loaded. Each successive macroblock in the last row, other than the last macroblock, requires two additional macroblocks to be loaded, and the last macroblock does not require additional loading. The first slice group SG0 requires a total loading of 143 macroblocks which is the equivalent of approximately 1.45 frames. The second slice group SG1 is initiated beginning with iteration 715 in which six macroblocks are loaded for the first macroblock of the second row. Each subsequent macroblock in the row, other than the last, requires an additional loading of three macroblocks each for a total of 33 macroblocks for the row. Each subsequent row of the second slice group SG1 is the same as the first for a total loading of 132 macroblocks or approximately 1.33 frames. The total number of macroblocks loaded for the current frame 700 is 275, which is equivalent to approximately 2.78 frames for loading reference data for motion estimation.

Figure 8:
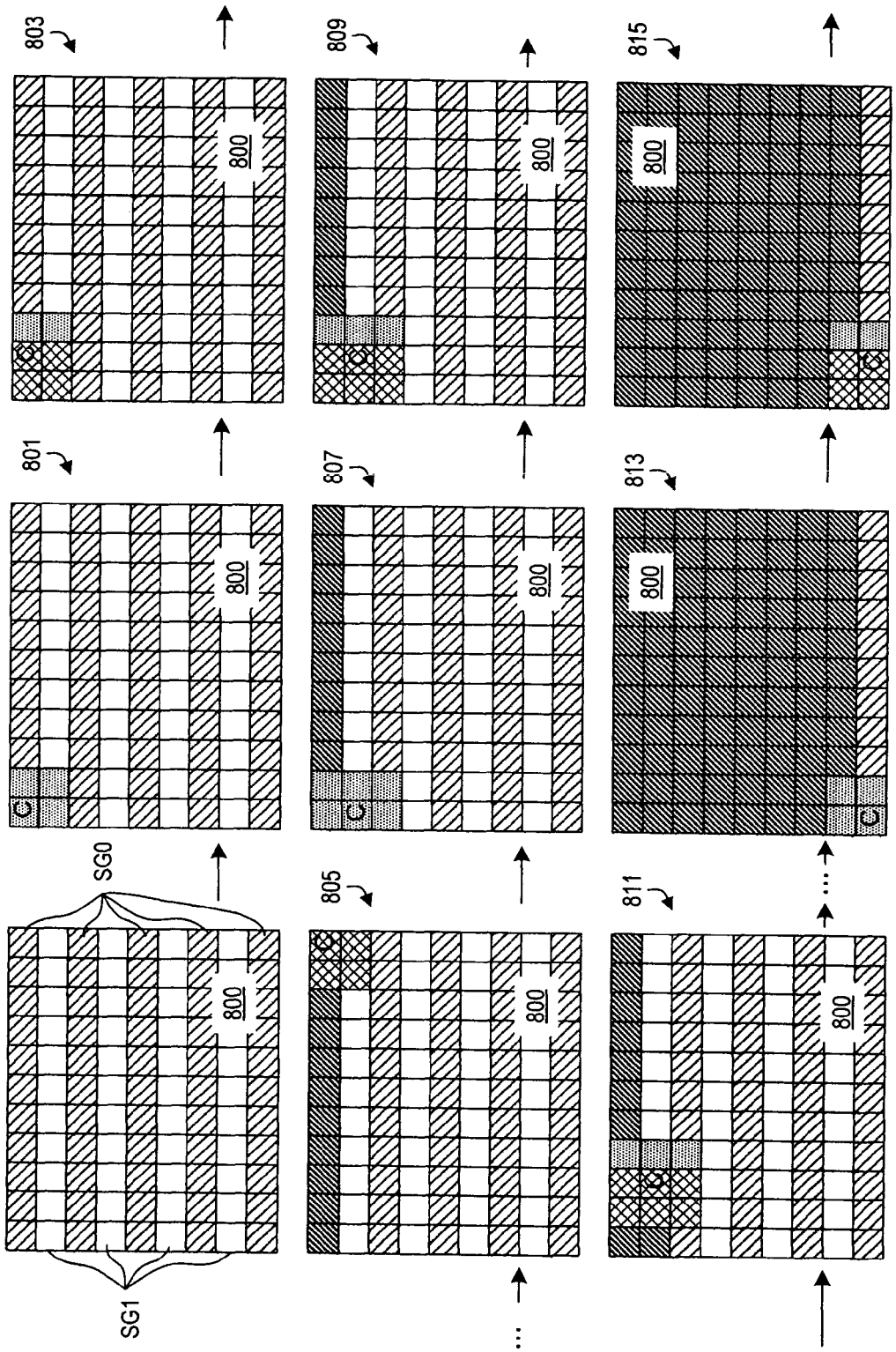
FIG. 8 is a series of diagrams illustrating data loading from a reference frame for motion estimation processing during inter-prediction encoding of a current frame organized as interleaved FMO using the video processing system of FIG. 3 implemented with the small buffer and operating according to an embodiment of the present invention.

FIG. 8 is a series of diagrams illustrating data loading from a reference frame for motion estimation processing during inter-prediction encoding of a current frame 800 organized as interleaved FMO using the video processing system 300 implemented with the small buffer and operating according to an embodiment of the present invention. As shown by iterations 801, 803 and 805, the first macroblock row is processed in substantially the same manner with the same number (i.e., 22) of macroblocks loaded as for the current frame 700 encoded according to the conventional method. As illustrated by subsequent iterations 807, 809 and 811, each intermediate row results in 6 initial macroblock loadings and 3 additional macroblock loadings per macroblock, other than the last, for a total of 33 macroblocks. And as illustrated by iterations 813 and 815, the last row results in an initial loading of four macroblocks followed by two macroblocks for each subsequent macroblock other than the last for a total of 22 macroblocks. The total number of macroblocks loaded for the current frame 800 is 275 macroblocks or the equivalent of approximately 2.78 frames for loading reference data for motion estimation.

It is appreciated that the number of macroblocks loaded from the reference frame for the current frame 800 for the interleaved FMO case is equal to the conventional method when the buffer is relatively small. Nonetheless, if the local memory 309 also allocates some space for unfiltered reconstructed information, and if at least one row of unfiltered macroblocks are stored in the local memory 309, then the unfiltered reconstructed information can be further filtered (deblocking) to generate the deblocked reconstructed information. In this manner, the unfiltered reconstructed information is not transferred back and forth across the memory bus 305 so that data traffic and power consumption are reduced for improved operation.

Figure 9:
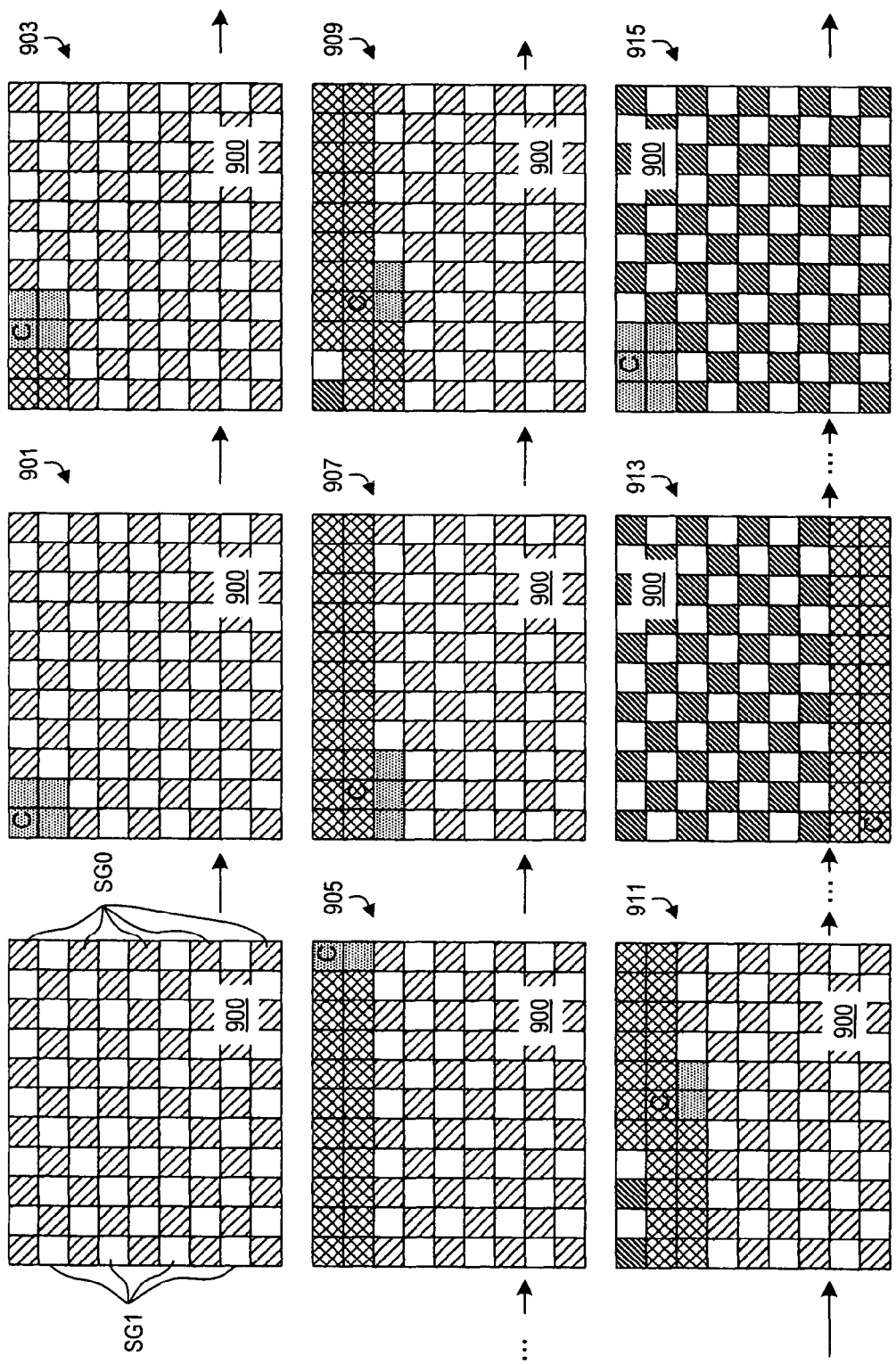
FIG. 9 is a series of diagrams illustrating data loading from a reference frame for motion estimation processing during inter-prediction encoding of a current frame organized as scattered FMO using a conventional video encoder implemented with the larger buffer.

FIG. 9 is a series of diagrams illustrating data loading from a reference frame for motion estimation processing during inter-prediction encoding of a current frame 900 organized as scattered FMO using a conventional video encoder implemented with the larger buffer. In the illustrated embodiment, the larger buffer can hold up to two rows of macroblocks from the reference frame. In the scattered configuration, a first slice group SG0 includes the first macroblock of the top row of macroblocks and every other macroblock thereafter following scan order. Again, each macroblock of the first slice group SG0 is lightly shaded with diagonal lines and each macroblock of the second slice group SG1, comprising the second macroblock of the top row and every other macroblock thereafter, is not shaded. In the first iteration 901, four macroblocks are loaded as usual. In the next iteration 903, the second macroblock is skipped as belonging to a different slice group and the third macroblock becomes the current macroblock. Since a column is skipped, another four macroblocks are loaded, and operation continues in the same manner for every other macroblock in the first row except the last shown by iteration 905, in which two additional macroblocks are loaded. In this manner, 22 macroblocks from the reference frame are loaded for the alternating macroblocks of the first row in slice group SG0 for performing motion estimation.

The next current macroblock C for the first slice group SG0 is the second macroblock of the second row as shown by iteration 907. At this point, the first two rows are stored in the local memory 309, so that three macroblocks from the third row are loaded. And two macroblocks are loaded for encoding each subsequent macroblock in the second row as illustrated by sequential iterations 909 and 911, for a total of 11 macroblocks for the row. Although not shown, the next 6 rows each result in the loading of 11 macroblocks. And the last row does not require any further loading as illustrated by iteration 913 since the last two rows are already loaded during prior iterations. In this manner, the first slice group SG0 for the current frame 900 results in the loading of 99 macroblocks equivalent to one complete frame of macroblocks. The next slice group SG1 begins with the second macroblock of the first row as shown by iteration 915. Although not specifically shown, the first row results in the loading of 22 macroblocks, the intermediate rows result in the loading of 11 macroblocks each, and the last row does no require further loading, so that the second slice group SG1 results in 99 macroblocks or the equivalent of 1 frame of loading. Thus, the total loading for the current frame 900 is 2 frames of macroblocks for the reference data for motion estimation.

Figure 10:
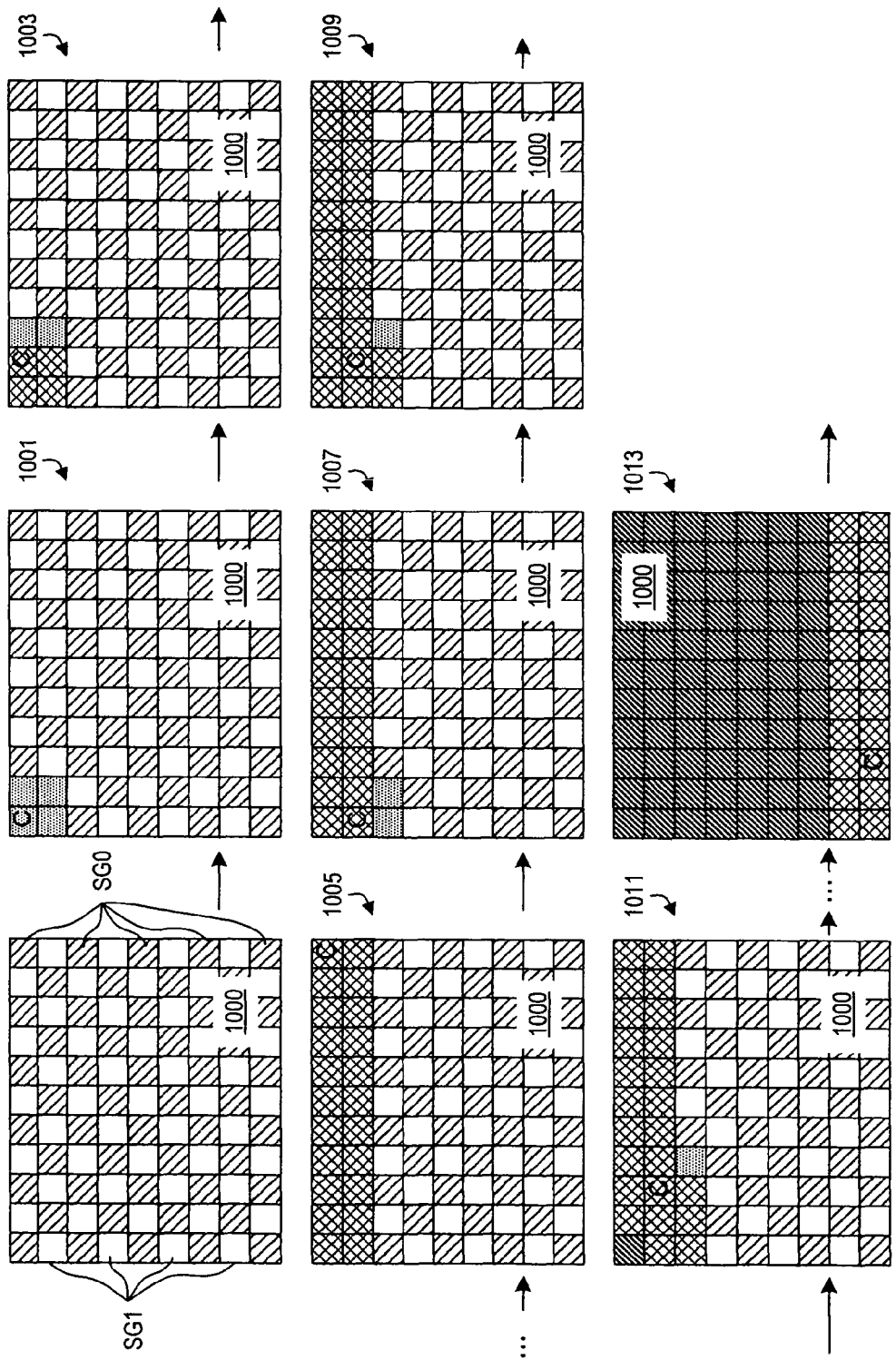
FIG. 10 is a series of diagrams illustrating data loading from a reference frame for motion estimation processing during inter-prediction encoding of a current frame organized as scattered FMO using the video processing system of FIG. 3 implemented with the larger buffer and operating according to an embodiment of the present invention.

FIG. 10 is a series of diagrams illustrating data loading from a reference frame for motion estimation processing during inter-prediction encoding of a current frame 1000 organized as scattered FMO using the video processing system 300 implemented with the larger buffer and operating according to an embodiment of the present invention. Again, the larger buffer holds two macroblock rows plus an additional three macroblocks. The iterations 1001, 1003, 1005, 1007, 1009, 1011, and 1013 illustrated are substantially the same as the corresponding iterations 601, 603, 605, 607, 609, 611, and 613, respectively, of the interleaved FMO case shown in FIG. 6. The current frame 1000 encoded using natural raster scan macroblock ordering resulted in the loading of only 99 macroblocks whereas the current frame 900 encoded according to the conventional method for scattered slice group ordering required twice as many macroblocks or two full frames. The video processing system 300 implemented according to an embodiment of the present invention reduces the amount of macroblock loading from the reference frame by 50% for the scattered FMO case with a larger buffer for motion estimation.

Figure 11:
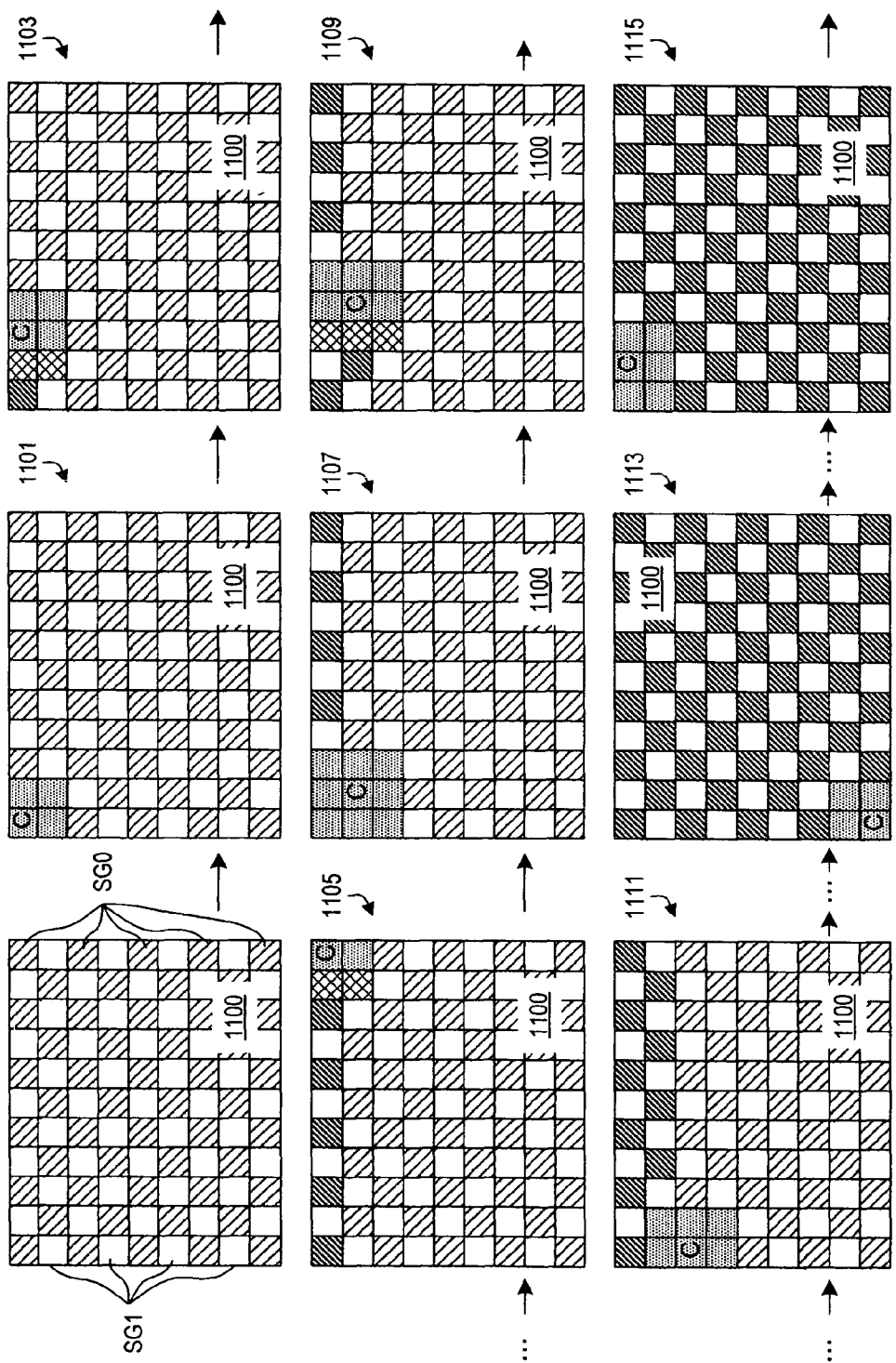
FIG. 11 is a series of diagrams illustrating data loading from a reference frame for motion estimation processing during inter-prediction encoding of a current frame organized as scattered FMO using a conventional video encoder implemented with the small hardware buffer.

FIG. 11 is a series of diagrams illustrating data loading from a reference frame for motion estimation processing during inter-prediction encoding of a current frame 1100 organized as scattered FMO using a conventional video encoder implemented with the small hardware buffer (e.g., capable of storing 3×3 macroblocks from the reference frame for the search window). The first iteration 1101 requires loading of 4 macroblocks, the second iteration 1103 requires loading of 4 macroblocks and so on up to the last iteration 1105 for the first row which requires an additional 2 macroblocks for a total of 22 macroblocks. The first macroblock for the first slice group SG0 in the second row requires all 9 macroblocks of the search window to be loaded as shown by iteration 1107. The remaining four macroblocks of the slice group SG0 in the second row each requires the loading of an additional 6 macroblocks for a total of 33 macroblocks for the second row of the first slice group SG0. Each of the macroblocks of the slice group SG0 in the third row, other than the last, require the loading of 6 macroblocks each and the last macroblock requires the loading of an additional 3 for a total of another 33 macroblocks as illustrated by iteration 1111. The remaining five intermediate rows require loading of 33 macroblocks each. The last row of the slice group SG0 requires the loading of four macroblocks each as illustrated by iteration 1113 except for the last macroblock, which adds another 2 macroblocks for a total of 22 macroblocks. In this manner, the slice group SG0 requires a total loading of 275 macroblocks.

The first current macroblock C of the second slice group SG1 is shown by iteration 1115 requiring the loading of another 6 macroblocks. Operation proceeds across the row for a total loading of 22 macroblocks. The intermediate rows each requires the loading of 33 macroblocks in a similar manner as described for the first slice group SG0 and the last row requires the loading of another 22 macroblocks for a total of 275 for the second slice group SG1. In this manner, a total of 550 macroblocks are loaded for the current frame 1100, which is the equivalent of 5.56 frames of macroblocks for loading reference data for performing motion estimation.

Figure 12:
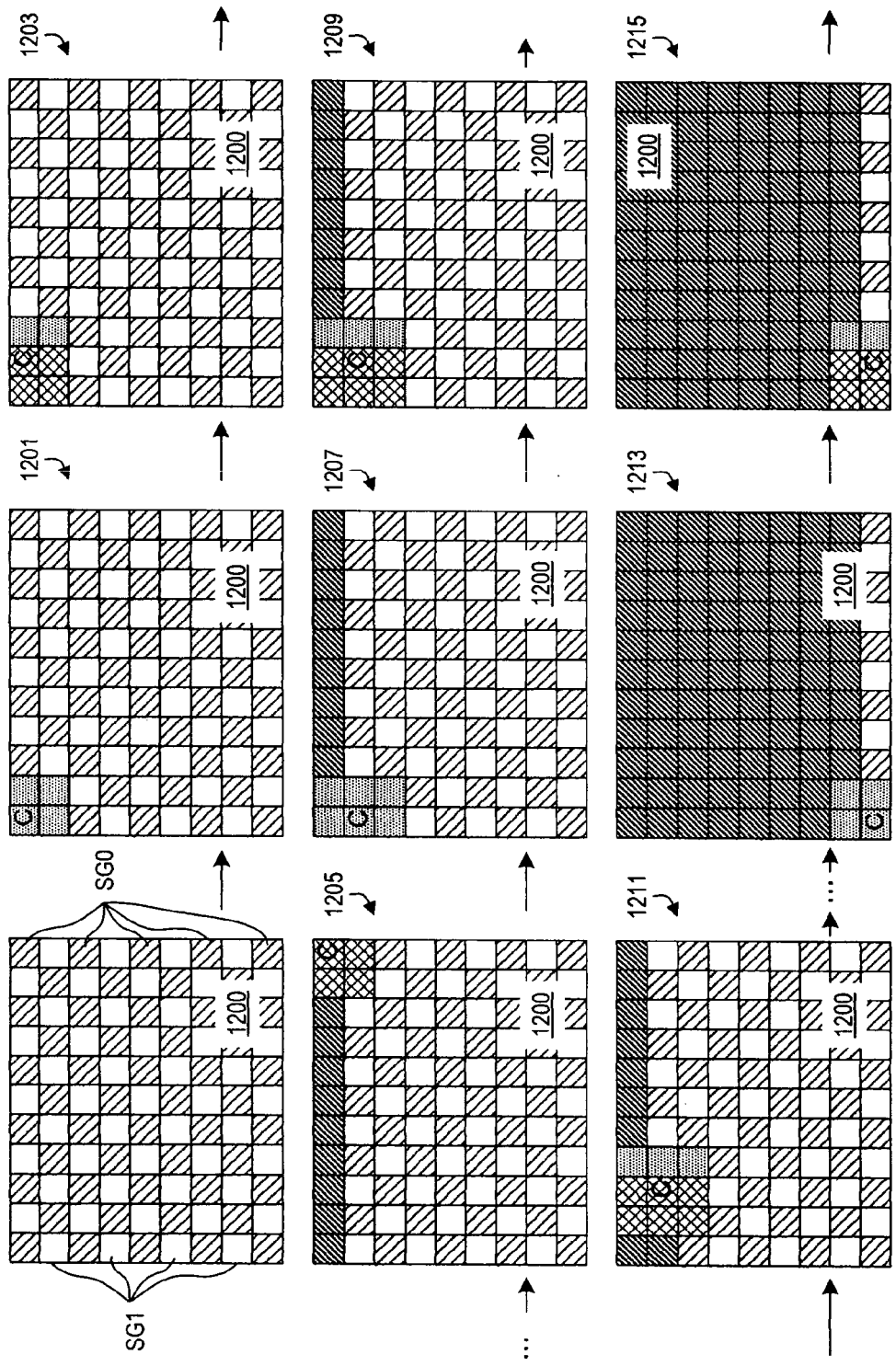
FIG. 12 is a series of diagrams illustrating data loading from a reference frame for motion estimation processing during inter-prediction encoding of a current frame 1200 organized as scattered FMO using the video processing system of FIG. 3 implemented with the smaller hardware buffer and operating according to an embodiment of the present invention.

FIG. 12 is a series of diagrams illustrating data loading from a reference frame for motion estimation processing during inter-prediction encoding of a current frame 1200 organized as scattered FMO using the video processing system 300 implemented with the smaller hardware buffer and operating according to an embodiment of the present invention. The iterations 1201, 1203, 1205, 1207, 1209, 1211, 1213 and 1215 illustrated are substantially the same as the corresponding iterations 801, 803, 805, 807, 809, 811, 813 and 815, respectively, of the interleaved FMO case shown in FIG. 8. The current frame 1200 encoded according to raster scan order results in the loading of 275 macroblocks whereas the current frame 1100 encoded according to the conventional method for scattered slice group ordering required twice as many macroblocks or 550 macroblocks. The video processing system 300 implemented according to an embodiment of the present invention reduces the amount of macroblock loading from the reference frame by 50% for the scattered FMO case with a smaller buffer for motion estimation.

Figure 13:
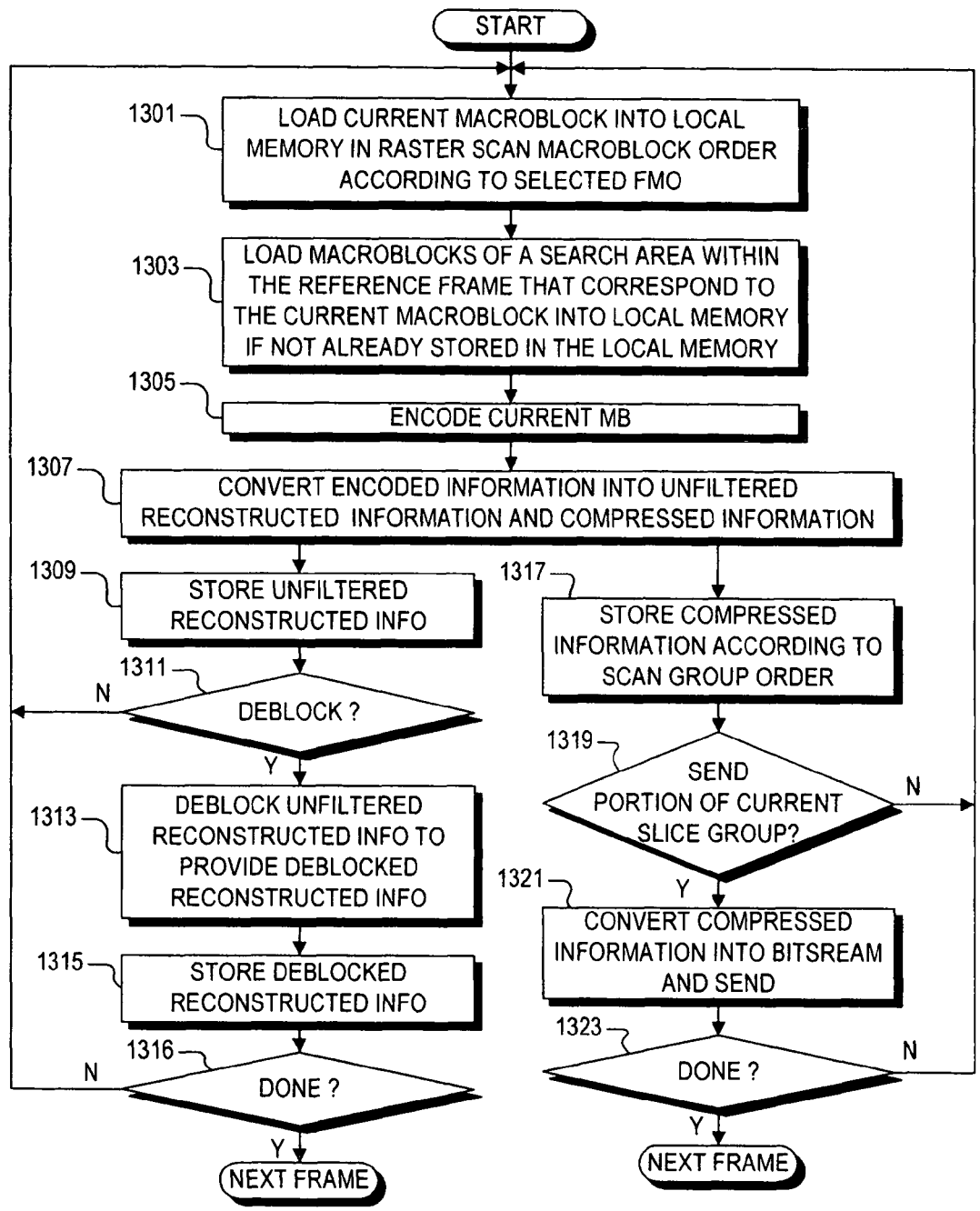
FIG. 13 is a flowchart diagram illustrating operation of the video processing system of FIG. 3 implemented according to an embodiment of the present invention for processing each frame of a video input.

FIG. 13 is a flowchart diagram illustrating operation of the video processing system 300 implemented according to an embodiment of the present invention for processing each frame of a video input. At a first block 1301, the first or next current macroblock of the current frame 202 is loaded into the local memory 309 in raster scan macroblock order instead of slice group order according to the selected FMO (e.g., interleaved, scattered, etc.). At next block 1303, the macroblocks from the search area 401 of the reference frame 209 that correspond to the current macroblock are loaded into the local memory 309 if not already stored in the local memory 309. In the illustrated embodiment, the collocated and neighboring macroblocks form the search area 401 and only those macroblocks which are not already in the local memory 309 are transferred from the external memory 201. Because the encoding of the current macroblock is in raster scan macroblock order, the amount of loading is minimized as compared to conventional slice group order processing which often requires substantially more loading. The amount of loading depends upon the size of the local memory 309 as previously described. At next block 1305, the current macroblock is encoded using the reference information for prediction and transform encoding. The coded information generally corresponds to the X coefficients at the output of the quantization circuit 221, shown in FIG. 2.

Operation proceeds to block 1307 in which the predicted, transformed, and quantized information is inversely converted to form a portion of the unfiltered reconstructed frame 232. The predicted, transformed, and quantized information is also converted into compressed bitstream for transmission. At this point, two different processing paths are performed including a first path for reconstruction and a second path for bitstream transmission. The processing of bitstream transmission is discussed further below. The unfiltered reconstructed information is stored at next block 1309. As previously described, in one embodiment the unfiltered reconstructed information is stored in the local memory 309 depending upon the size and configuration of the local memory 309 and operation of the video processor system 300. If the local memory 309 has the capacity to store one row of unfiltered reconstructed macroblocks, then each unfiltered reconstructed macroblock is stored back into the local memory 309 to avoid the additional data traffic on the memory bus 305 and any additional power consumption. Otherwise, the unfiltered reconstructed information is stored to the external memory 201. At next block 1311, it is queried whether sufficient reconstructed information is available to initiate deblock filtering. If not, operation returns back to block 1301 to load the next macroblock of the current frame 202 as the new current macroblock. If sufficient unfiltered reconstructed information is available to initiate deblock filtering, operation proceeds to block 1313 in which a portion of the unfiltered reconstructed information is deblock filtered to provide corresponding deblocked reconstructed information. As understood by those skilled in the art, the unfiltered reconstructed pixel information of adjacent macroblocks is used for deblock filtering. For example, after all macroblocks of the first row and the first block of the second row of the current frame 202 have been reconstructed, sufficient information is available to filter the first reconstructed macroblock of the first row into a deblocked macroblock. And then when the second macroblock of the second row has been reconstructed, sufficient information is available to filter the second reconstructed macroblock of the first row into a deblocked macroblock, and so on. Operation then proceeds to next block 1315 to store the deblocked reconstructed information, such as in the external memory 201 as the reference frame 209 (for encoding the next frame) and then to block 1316 to determine whether the current frame has been completely processed. If not, operation returns to block 1301 for the next macroblock. When the current frame processing is completed, operation proceeds to the next frame, if any.

Referring back to block 1307, the second path starts with block 1317 in which the compressed information is stored according to slice group order. In particular, the compressed information of the first slice group (e.g., SG0) is stored together, the compressed information of the second slice group (e.g., SG1) is stored together, and so on. In this manner, the current frame 202 is processed in raster scan macroblock order and the compressed information is organized and stored according to the slice groups. With reference to FIG. 6, the compressed information for each macroblock of the current frame 600 for the first slice group SG0 (rows 1, 3, 5, 7 and 9) Is stored together into a first slice group of compressed information, whereas the compressed information for each macroblock of the current frame 600 for the second slice group SG1 (rows 2, 4, 6 and 8) is stored together into a second slice group of compressed information. With reference to FIG. 10, the compressed information for each macroblock of the current frame 1000 for the first slice group SG0 (macroblocks 1, 3, 5, 7, . . . , 99) are stored together into a first slice group of compressed information, whereas the compressed information for each macroblock of the current frame 1000 for the second slice group SG1 (macroblocks 2, 4, 6, 8, . . . , 98) are stored together into a second slice group of compressed information. The storing of the compressed information in slice group order facilitates the transmission, if applicable, of the information in slice group order to achieve the benefits of FMO as previously described.

The location of the stored compressed slice group information depends upon the particular configuration. In one embodiment, the compressed slice groups are stored within the local memory 309. This first embodiment facilitates access by the output circuit 313 as controlled by the processor 307 of the compressed information for transmission of the bitstream BS. In this case, the compressed information does not have to be transferred to the external memory 201 and re-transferred back to the local memory 309 or the output circuit 313 for transmission thereby reducing the traffic data across the memory bus 305 and also reducing the corresponding power consumption. In an alternative embodiment, the compressed information is stored in the external memory 201.

At next block 1319, it is queried whether to send a portion of the "current" slice group, such as via the channel 103. In certain embodiments the video information is encapsulated into data packets for transmission via the channel 103. The packets may be configured in any one of many different formats and sizes. For example, the packets may be configured to have a fixed number of bits per packet, or a fixed number of macroblocks per packet, or configured according to particular communication standards, etc. Such variables depend on several factors, such as the configuration of the encoder, the performance of the channel 103, the service provider, etc. If a sufficient amount of compressed information has not been processed, or if the system is not ready to send video information, operation returns to block 1301 to load the next macroblock of the current frame 202 as the new current macroblock. If sufficient compressed information has been received, operation proceeds to block 1321 in which a portion of the compressed information is converted into the appropriate format for the bitstream and sent on the channel 103. Since the current frame is processed in raster scan macroblock order and organized into multiple slice groups according to a selected FMO type, compressed information accumulates for both the first and second slice groups along with slice groups, if any. The first slice group is initially the current slice group and increments in slice group order as the slice groups are sent. According to FMO operation, the first slice group is sent in its entirety, section by section (or packet by packet), followed by the second slice group, and then by the third slice group, and so on according to the selected slice group order. In this manner, the compressed information of the subsequent slice groups may be stored in their entireties before being sent. As appreciated by those skilled in the art, however, each macroblock representation of the compressed information is significantly smaller than the macroblocks of the uncompressed current frame and reference frame so that the compressed information consumes considerably less memory space.

At next block 1323, it is queried whether the bitstream for the current frame has been completely sent (or stored). If not, operation returns to block 1301 for the next macroblock and if so, operation is completed for the current frame and proceeds to the next current frame, if any. In an alternative embodiment, the compressed information is stored, such as within the external memory 201, and sent at a later time by the video processor system 300 or by another system (not shown).

A video processing system according to an embodiment of the present invention includes a memory and a video processor. The memory stores a current frame, a reference frame, and multiple slice groups. The video processor encodes the current frame in raster scan macroblock order for flexible macroblock ordering (FMO) using information from the reference frame, converts encoded information into compressed information, and stores the compressed information according to said FMO into the slice groups into the memory.

The video processing system may further include an output circuit which sends the slice groups as a bitstream in slice group order. The memory may further store program code which is executed by the video processor to perform video processing functions. The memory may include separate portions including a first memory and a second memory in which the first memory stores the current frame and the reference frame. In this embodiment, the video processor loads a macroblock of a search window of the reference frame from the first memory into the second memory while encoding the current frame if the macroblock is not already stored in the second memory. Further, the video processor may be operative to convert the encoded information into unfiltered reconstructed information and to store the unfiltered reconstructed information into the second memory. In this latter embodiment, the video processor deblock filters the unfiltered reconstructed information and provides deblocked reconstructed information. The deblocked reconstructed information may be stored into the first memory.

A video encoder according to an embodiment of the present invention includes an external memory and a processing block. The external memory stores a current frame and a reference frame. The processing block includes a memory interface, a local memory and a processor. The processor encodes the current frame in raster scan macroblock order using information from the reference frame, converts encoded information into compressed information, and organizes the compressed information according to a predetermined FMO.

The processor may organize the compressed information according to interleaved FMO or scattered FMO or according to any other suitable FMO organization. The processor may store the compressed information into multiple slice groups into the local memory or into the external memory, where the slice groups are organized according to the predetermined FMO. The processor may be configured to load a macroblock from the reference frame into the local memory in which the macroblock is part of a current search window and is not already stored in the local memory. The processor may be configured to convert the encoded information into unfiltered reconstructed information, to store the unfiltered reconstructed information into the local memory, and to deblock filter the unfiltered reconstructed information to provide deblocked reconstructed information. The video encoder may include an output circuit which sends the compressed information as a bitstream in slice group order according to the predetermined FMO.

A method of encoding video according to an embodiment of the present invention includes encoding each macroblock of a current video frame in raster scan macroblock order using information from a reference frame and providing encoded information, converting the encoded information into compressed information, and storing the compressed information into a plurality of slice groups according to a predetermined FMO.

The method may include converting the compressed information in slice group order according to the predetermined FMO into a bitstream. The method may include storing the compressed information into multiple slice groups according to interleaved or scattered FMO or according to any other suitable FMO organization. The method may include loading a macroblock of a search window of the reference frame stored in an external memory into a local memory if the macroblock is not already stored in the local memory. The method may include converting the encoded information into unfiltered reconstructed information, storing the unfiltered reconstructed information into the local memory, and deblock filtering the unfiltered reconstructed information using the unfiltered reconstructed information stored in the local memory and generating deblocked reconstructed information. The method may include encoding and converting according to the H.264 standard. The method may include transmitting information via a wireless channel and decoding the information by a wireless receiver.

While particular embodiments of the present invention have been shown and described, it will be recognized to those skilled in the art that, based upon the teachings herein, further changes and modifications may be made without departing from this invention and its broader aspects. For example, although the present invention is illustrated with interleaved and scattered FMO, other FMO configurations are contemplated, including those that are currently defined and those that are newly defined including any user-defined FMOs. The appended claims are intended to encompass within their scope all such changes and modifications as are within the true spirit and scope of this invention.

What is claimed is:

1. A video processing system, comprising:
    a memory which stores a current frame, a reference frame, and a plurality of slice groups; and
    a video processor, coupled to said memory, which encodes said current frame in raster scan macroblock order for flexible macroblock ordering (FMO) using information from said reference frame, which converts encoded information into compressed information, and which stores said compressed information according to said FMO into said plurality of slice groups into said memory;
    wherein said video processor begins encoding a second one of said plurality of slice groups of said current frame before completing encoding of a first one of said plurality of slice groups of said current frame.

2. The video processing system of claim 1, further comprising an output circuit, coupled to said video processor, which sends said plurality of slice groups as a bitstream in slice group order.

3. The video processing system of claim 1, wherein said memory stores program code which is executed by said video processor to perform video processing functions.

4. The video processing system of claim 1, wherein:
    said memory comprises a first memory and a second memory in which said first memory stores said current frame and said reference frame; and
    wherein said video processor loads at least one macroblock of a search window of said reference frame from said first memory into said second memory while encoding said current frame.

5. The video processing system of claim 4, wherein:
    said video processor converts said encoded information into unfiltered reconstructed information and stores said unfiltered reconstructed information into said second memory; and
    wherein said video processor deblock filters said unfiltered reconstructed information and provides deblocked reconstructed information.

6. The video processing system of claim 1, wherein said memory and video processor are part of a battery-powered device.

7. A video encoder, comprising:
    an external memory which stores a current frame and a reference frame; and
    a processing block, comprising:
        a memory interface coupled to said external memory;
        a local memory coupled to said memory interface; and
        a processor, coupled to said memory interface and said local memory, which encodes said current frame in raster scan macroblock order for flexible macroblock ordering (FMO) using information from said reference frame, which converts encoded information into compressed information, and which organizes said compressed information into a plurality of slice groups according to said FMO;
        wherein said processor begins encoding a second one of said plurality of slice groups of said current frame before completing encoding of a first one of said plurality of slice groups of said current frame.

8. The video encoder of claim 7, wherein said processor organizes said compressed information according to a selected one of scattered FMO and interleaved FMO.

9. The video encoder of claim 7, wherein said processor stores said plurality of slice groups within said local memory.

10. The video encoder of claim 7, wherein said processor stores said plurality of slice groups within said external memory.

11. The video encoder of claim 7, wherein said processor loads a macroblock from said reference frame into said local memory which is part of a current search window and which is not already stored in said local memory.

12. The video encoder of claim 7, wherein said processor converts said encoded information into unfiltered reconstructed information, stores said unfiltered reconstructed information into said local memory, and deblock filters said unfiltered reconstructed information stored in said local memory to provide deblocked reconstructed information.

13. A method of encoding video, comprising:
  encoding each macroblock of a current video frame in raster scan macroblock order for flexible macroblock ordering (FMO) using information from a reference frame and providing encoded information;
  converting the encoded information into compressed information; and
  storing the compressed information into a plurality of slice groups according to the FMO;
  wherein said encoding each macroblock of a current video frame includes encoding a macroblock of a second one of the plurality of slice groups before encoding each macroblock of a first one of the plurality of slice groups.

14. The method of claim 13, further comprising converting the compressed information in slice group order according to the FMO into a bitstream.

15. The method of claim 13, wherein said storing the compressed information into a plurality of slice groups comprises storing according to interleaved FMO.

16. The method of claim 13, wherein said storing the compressed information into a plurality of slice groups comprises storing according to scattered FMO.

17. The method of claim 13, wherein said encoding each macroblock of the current video frame comprises loading at least one macroblock of a search window of the reference frame stored in an external memory into a local memory.

18. The method of claim 17, further comprising:
  converting the encoded information into unfiltered reconstructed information;
  storing the unfiltered reconstructed information into the local memory; and
  deblock filtering the unfiltered reconstructed information using the unfiltered reconstructed information stored in the local memory and generating deblocked reconstructed information.

19. The method of claim 13, wherein said encoding and converting are according to the H.264 standard.

20. The method of claim 13, further comprising transmitting information via a wireless channel and decoding the information by a wireless receiver.

* * * * *